United States Patent [19]

Barbulescu et al.

[11] Patent Number: 4,534,868

[45] Date of Patent: Aug. 13, 1985

[54] SYSTEM AND METHOD FOR EXTRACTING LIQUID FROM A HUMID MASS BY COMPRESSION

[75] Inventors: Adrian Barbulescu, Ste-Foy; Rodrique Boulet, Duberger; Denis Lessard, Ste-Foy, all of Canada

[73] Assignee: Centre de Recherche Industrielle du Quebec, Quebec, Canada

[21] Appl. No.: 493,811

[22] Filed: May 12, 1983

[30] Foreign Application Priority Data

Jun. 1, 1982 [CA] Canada .................................. 404223

[51] Int. Cl.³ ............................................. B01D 33/00

[52] U.S. Cl. .................................... 210/780; 210/350; 210/388

[58] Field of Search ............... 210/770, 771, 780, 224, 210/248, 350, 351, 359, 403, 433.1, 388

[56] References Cited

U.S. PATENT DOCUMENTS

| | | | |
|---|---|---|---|
| 483,847 | 10/1892 | Jaeger | 210/433.1 |
| 2,409,713 | 10/1946 | Sharples | 210/771 |
| 2,663,427 | 12/1953 | Aiedel | 210/433.1 |
| 3,481,475 | 12/1965 | Ruthrof et al. | 210/433.1 |
| 3,550,775 | 12/1970 | Cooley | 210/770 |
| 4,088,577 | 5/1978 | Muller | 210/770 |

*Primary Examiner*—John Adee
*Attorney, Agent, or Firm*—Oblon, Fisher, Spivak, McClelland & Maier

[57] ABSTRACT

The present invention relates to a system and a method of extracting liquid from a humid mass by compressing same. The system comprises a conduit of linear, circular or other shape through which the humid mass is displaced. The conduit is of rectangular cross-section, which cross-section can be constant or variable. Further, the conduit has perforated side walls along at least a liquid extraction working section of the conduit. The system further comprises elements which cause an axial pressure at the interior of the humid mass as well as a mechanism to displace at least one of the perforated side walls to convey the humid mass along the working section of the conduit in such a way as to generate between the interior surface of the perforated side walls and the humid mass a dynamic friction force which defines a pressure zone which is less than the axial pressure created by the pressure creating elements. This difference in pressure causes the liquid in the humid mass to flow out of the mass in a direction substantially transverse to the displacement direction of the humid mass and out through the perforated side walls of the conduit.

23 Claims, 6 Drawing Figures

WATER
WATER
V2
V1
L
$P_O$
$P_I$
$F_2$
$F_1$
FEED MECHANISM

WATER
WATER
$V_2 = 0$
$V_1$
$P_O$
$P_I$
$F_2$
$F_1$
FEED MECHANISM

SYSTEM AND METHOD FOR EXTRACTING LIQUID FROM A HUMID MASS BY COMPRESSION

BACKGROUND OF INVENTION (a) Field of the Invention

The present invention relates to a system and method of extracting a liquid contained in a humid mass and wherein the extraction takes place by pressurizing the mass to cause the liquid to flow out of the mass.

The applications of the system and method of the present invention are quite numerous such as the extraction of juice from fruits or vegetables, or the extraction of liquid contained in grains or in waste of all types, as well as water contained in peat moss. This last application is of particular importance to the present invention when considering that peat moss contains a high percentage of water, which percentage can be as high as 96%.

(b) Description of Prior Art

In order to extract liquid from a humid mass, such as peat moss, various systems and methods have been proposed and are presently being used in order to try and obtain a final product which has a low percentage of liquid therein or an optimum quantity of liquid, as is the case when extracting juices from fruits or vegetables. It is known with many existing systems to use a thermal drawing method whereby to obtain a dry final product. However, such methods are quite expensive due to their high energy consumption thereby augmenting the cost of obtaining the final product. Because of these high costs, the producers utilize systems which are mainly mechanical whereby to continuously extract liquids from such humid mass. These mechanical means comprise centrifugal systems, piston press systems, screw presses, roll presses and converging conveyor presses. All of these systems, however, have major disadvantages, either at their level of construction, utilization, or maintenance due to their particular configuration, as is the case in a converging conveyor press which often cannot permit the passage of a large particle which may be contained in the mass thereby affecting the functioning of the system or resulting in a product at the output of the system having a non-uniform density. Furthermore, presently known systems are fairly large in construction and occupy a large space particularly those systems having long liquid extraction conduits through which the humid mass must travel. One reason for the long conduit is that it is necessary to subject the humid mass to a long travel time in order to remove liquid therefrom.

SUMMARY OF INVENTION

It is a feature of the present invention to provide a system and method for continuously extracting liquid from a humid mass and which functions differently from known prior art systems and methods and which substantially overcomes all of the above-mentioned disadvantages of the prior art.

Another feature of the present invention is to provide a system and method of continuously extracting liquid from a humid mass and wherein the functioning of the system is not affected by the presence of large foreign matter or particles which may be conveyed into the system together with the humid mass.

Another feature of the present invention is to provide a system and method of continuously extracting liquid from a humid mass and which is of a dimension substantially less than known systems of the prior art. This is achievable due to a new principle of operation of the present invention and which consists generally in the creation of a differential pressure by mechanical means along the channel or conduit through which is displaced the humid mass to be treated.

Another feature of the present invention resides in a system and method of continuously extracting liquid from a humid mass, which extraction is effected by pressurizing the mass to create a differential pressure between the center and the periphery of the conduit through which the humid mass is displaced. The pressure is obtained by displacing one of the side walls at a speed which is different from the other side walls which form the conduit to convey the humid mass.

According to the above features, from a broad aspect, the present invention provides a system for extracting liquid from a humid mass. The system comprises a conduit having an inlet end for admitting a humid mass therein as a continuous stream. The conduit has a perforated section in at least a working section of the conduit. Means is provided to gradually and progressively create an axial pressure at the interior of the humid mass. The conduit has a movable side wall section having a surface area greater than the surface area of the remaining side wall section. Means is provided to impart continuous movement to the movable side wall so that the movable side wall is displaced axially along at least the working section of the conduit for displacing a humid mass axially along at least the working section of the conduit and creating a dynamic friction force between the inner surface of the conduit and the humid mass to define a pressure zone which is inferior to the axial pressure whereby to establish a differential pressure through the mass to cause liquid therein to flow out of the mass transversely to the direction of travel of the mass and out of the conduit through the perforated section. The conduit also has an outlet end through which is discharged a continuous output of the humid mass containing only a small percentage of liquid therein.

According to a further broad aspect of the present invention, there is provided a method of continuously extracting liquid from a humid mass by pressurization of the mass. The method comprises the steps of feeding the humid mass to an inlet end of a conduit as a continuous stream, the conduit having a perforated section in at least a working section thereof. An axial pressure is created at the interior of the humid mass. A movable side wall section of the conduit is continuously moved axially along at least the working section. The movable side wall section has a surface area greater than the surface area of the remaining side wall section of the conduit whereby to continuously displace the mass axially along at least the working section and to generate between the movable side wall section and the humid mass a dynamic friction force thereby creating a pressure which is inferior to the axial pressure whereby to create between the side wall section and the humid mass a low pressure zone which causes the liquid in the liquid mass to be displaced transversely to the direction of travel of the humid mass and to flow out of the conduit through the perforated section. The mass is continuously discharged at an outlet end with only a small percentage of liquid contained therein.

In a preferred embodiment of the present invention the conduit is a linear conduit having a constant rectangular cross-section and comprising active and passive side walls. The active side wall is moved at a constant speed whilst the passive side wall is displaced at a lower speed.

According to another preferred embodiment of the present invention there is provided a system for continuously extracting a liquid from a humid mass and wherein the extraction conduit is a section of conduit which is of constant or variable cross-section and comprises active and passive side walls. In this embodiment the active side wall is displaced at a constant speed while the passive side wall is stationary.

According to a further preferred embodiment of the present invention there is provided a liquid extraction conduit wherein the active side wall is constituted by the peripheral surface of a wheel which is rotated at a substantially constant speed. The active side wall may have an inner peripheral wall and fixed perforated lateral side walls about the perimeter of the wheel. The passive side wall of the conduit is held stationary about the wheel and acts as a cover to maintain the humid mass between it and the active side wall.

BRIEF DESCRIPTION OF DRAWINGS

A preferred embodiment of the present invention will now be described with reference to the examples thereof illustrated in the accompanying drawings, in which.

DESCRIPTION OF PREFERRED EMBODIMENTS

Figures 1, 3:
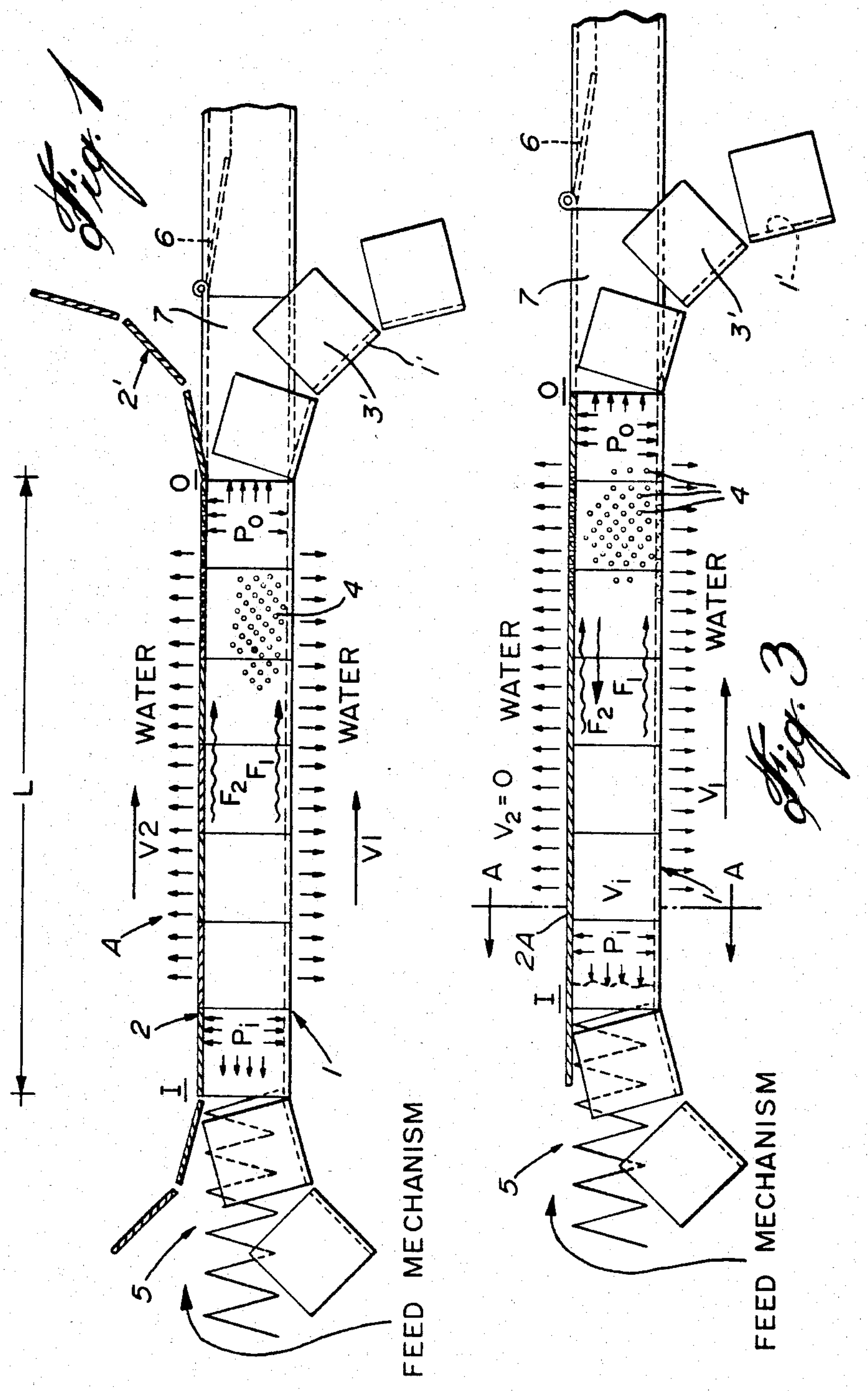
FIG. 1 is a schematic view of the pressure system of the present invention for continuously extracting liquid from a humid mass and utilizing a straight linear conduit of constant cross-section.
FIG. 3 is a schematic illustration of an example of the present invention as shown in FIG. 1 and wherein one of the side walls is maintained stationary.
Figure 2:
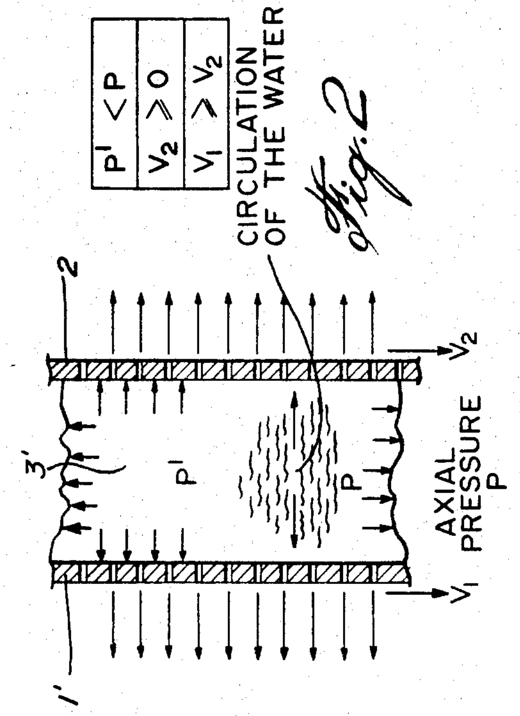
FIG. 2 is a schematic illustration showing the operation of the system of FIG. 1 for the continuous extraction of liquid from the humid mass.

Referring now to the drawings and more specifically to FIG. 1, there is shown a first example of the present invention wherein there is illustrated a system of continuously extracting a liquid from a humid mass. FIG. 2 illustrates the liquid extraction mechanism which constitutes the principle on which the operation of the system of FIG. 1 is based. Referring generally to these Figures, the system comprises a conduit A of rectangular cross-section which extends between the inlet I and the outlet O of the system. As shown, the conduit A has an active side wall 1 and a passive side wall 2. The active side wall is constituted by a plurality of panel sections each of which has a transverse panel 1′ and opposed lateral panel 3′, only one being shown in this Figure. The panel sections form a conduit of rectangular cross-section together with the opposed panel 2′. The conduit is formed in the straight section, between the inlet I and the outlet O, by a plurality of these rigid panels 1′, 2′, and 3′ which are constructed of thin rigid material having perforations 4 therein. The perforations are sufficient in number and size whereby to permit a liquid within the conduit to flow out of the conduit through the perforations.

Each of the lateral panels 3′ secured side by side at the opposed edges of the transverse panel 1′ displaces itself along the conduit A on guide elements (not shown) but obvious in construction to a person skilled in the art. The panels 2′ of the passive side wall 2 are also displaced in the same direction as the panels of the active side wall 1 but at a speed which is equal or less than that of the active side wall.

The extraction conduit is fed a humid mass, by means of a feed mechanism 5 such as a spiral feed screw. In the present example the feed is effected axially and produces by its pushing force an inlet pressure $P_e$ and outlet pressure $P_s$ on the humid mass which is conveyed along the conduit A. The pressure increases towards the exit O of the conduit A.

Referring now more specifically to FIG. 2, it is noted that the axial pressure P produces a differential pressure between the axial pressure applied in the central zone of the conduit and the weaker pressures created in the contact zone between the moving panels and the humid mass. This differential pressure causes liquid contained in the liquid mass to flow in a substantially transverse direction to the direction of displacement of the liquid mass. That is to say, the liquid in the humid mass is directed towards the periphery of the conduit A where a filtration or extraction of the liquid is effected through the perforations 4 provided in the various panels. The weak peripheral pressure is created by the friction force created between the liquid mass and the panels. The quantity of humid mass at the exit O, as well as the axial pressure, could be controlled by a rigid gate 6 which is pivotally secured at the end of a collector channel 7 having the same cross-sectional dimension as that of the conduit A.

The humid mass is displaced slowly from the inlet I to the outlet O at a speed which is different than the speed of displacement of the active and passive side walls whereby there is established between the inner surface of the panels and the humid mass dynamic friction forces which establish lateral pressures which are inferior to the pressure in the central zone of the conduit whereby to establish the differential pressure which causes the liquid to flow from the center of the humid mass towards the perforated side walls of the panels and also towards the back of the conduit whereby the liquid contained in the liquid mass is convected towards the exterior of the mass. It is pointed out that the dynamic friction forces as well as the axial pressure increase from the inlet I to the outlet O of the conduit. This increase in the friction forces cause the humid mass to become more and more less humid as it is displaced towards the outlet of the conduit. At the inlet of the conduit I the humid mass contains a large quantity of liquid and this liquid progressively diminishes as the humid mass is displaced along the conduit towards the outlet due to the continuous extraction of liquid toward the exterior at the conduit. Thus, the humid mass becomes more and more solid and the friction force and the pressure at its point of contact with the side walls of the conduit increases to achieve a maximum value at the outlet O. The convection of the liquid towards the exterior of the conduit is enhanced by the design of the system wherein all along the conduit the humid mass compresses and causes deformation of the particles of fibers therein which again enhances the extraction of liquid.

The system can be improved by conveying the panels 3' and 1' of the active side walls and the passive side walls at different speeds whereby to compress and mold the humid mass thereby enhancing the dewatering of the mass. In such a case the passive side wall 2 is displaced at a speed V2 which is lower than the speed V1 of the active side wall 1. The lateral pressure P' exerted on the contour of the conduit and the dynamic friction forces between the humid mass and the side walls generate friction forces F1 and F2. The friction coefficient f2 and f1 as well as the contact perimeters a2 and a1 (see the formula), being different, we obtain dynamic friction forces F1 superior to F2. On the other hand, as is usually the case with a humid mass having a high percentage of liquid therein, this mass possesses anisotropic characteristic which defines, in the present conditions, a lateral pressure P' which is less than the axial pressure P (see the formula). As mentioned hereinabove, the difference between the friction forces of each panel in movement contributes to an increase in the pressure along the conduit 1 up to a maximum value $P_o$ at the outlet O. This maximum value can be controlled or changed by modifying one or the other of the parameters $P_i$ (inlet pressure), f1, f2, a1 (contact perimeter of the active side wall), a2 (contact perimeter of the passive side wall), and the length L of the conduit as measured between the inlet I and the outlet O (see the formula).

Figure 3A:
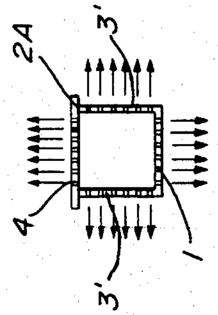
FIG. 3A is a transverse section view along sections lines A—A of FIG. 3.

It is interesting to note that when the passive side wall 2 is maintained stationary, in such a case the speed V2 is nil, the system to extract the liquid from the humid matter thus becomes more simple in conception. Referring to FIG. 3, the liquid extraction system is comprised substantially of the same elements as FIG. 1 but the filtrating panels constituting the side wall 2 have been replaced by a single stationary panel 2A. This panel 2A has perforations 4, as illustrated in FIG. 3A, which shows a cross-section of the conduit A along cross section lines A—A in FIG. 3. It is also seen in FIG. 3 that the cross-section of the conduit is constant from the inlet to the outlet which enhances the simplicity of the concept of the liquid extraction system of this invention.

As shown in FIG. 3, the mechanism for the extraction of liquid from the humid matter is similar to that as previously described with reference to FIG. 1 and produces substantally the same effects. However, since the speed of the side wall 2A is nil, the differences in the speed between the active and passive side walls result in retarding the humid mass which is conveyed by the side walls and develops reciprocal friction forces but opposite and proportional to the lateral pressures exerted by the humid matter on the various side walls.

In this arrangement the friction force F2 of the side wall 2A is smaller than the friction force F1 of the panel assembly of the active side wall due to the fact that the contact surface is larger between the moving panel assembly and the humid matter as well as the superior coefficient of friction between the panel assembly and the humid mass. However, in order to improve the performance of the system, the coefficient of friction of the side wall 2A can be lowered by coating the surface with a smooth material such as Teflon (registered trademark).

As in the case of the liquid extraction system of FIG. 1, a continuous action of compressing and kneading is effected on the humid matter all along the conduit A due to the differences between the friction forces F1 and F2 which accumulate from the inlet I to the outlet O of the conduit and it is this difference which contributes to the progressive increase of the pressure up to its maximum value. This maximum value is related to the differences between the contact perimeters between the filtering panel assembly which is moving and the fixed side wall 2A which is stationary, the different values between the coefficient of friction f1 and f2 the length L of the conduit measured from inlet I to the outlet S, as well as the initial pressure applied by the feed mechanism 5 on the humid matter.

If we assume that the conduit has a constant rectangular cross-section, these different parmeters can be interrelated to one another by the following equation:

$$L = \frac{bh}{k\,[(b + 2h)\,f_1 - bf_2]}\ \ln \frac{P}{P_i}$$

wherein,

L is the length necessary to develop the axial pressure P, b is the width of the rectangular section, h is the height of the rectangular section, k is P'/P, the relation between the lateral pressure P' and the axial pressure P, f1 is the coefficient of friction of the panal assembly constituting the active side wall, f2 is the coefficient of friction of the passive side wall, $P_i$ is the initial pressure at the inlet of the conduit.

We therefore calculate the axial pressure at a given distance from the inlet of the conduit as follows:

$$P = P_i \cdot e^{\left(\frac{L[k(b+2h)f1 - bf2]}{bh}\right)}$$

It is noted from the above formula that for parameter values of b, h, k, f1 and f2, the pressure increases exponentially with the length L and proportional to the initial pressure $P_i$ applied on the humid mass at the inlet of the conduit. However, increasing the length L of the conduit results in an increase of the dimension of the system. On the other hand, it is easier to influence the initial pressure $P_i$ by the use of any types of feed means adaptable to the humid mass and thus avoiding the above-mentioned disadvantage. With this arrangement, the extraction of the liquid from the humid mass functions adequately and efficiently in accordance with the pressure differential previously described.

In a general way, the present system of continuously extracting liquid by pressurization of a humid mass offers important characteristics in comparison with other mechanical systems known in the art and namely, provides for an improved retention time of the humid mass in the interior of the conduit which results in an improved liquid extraction system. The retention time of the humid mass is related to various factors such as the output of the mass which is controlled by the control means 6 secured at the outlet of the conduit, the confined volume between the inlet and outlet of the conduit as well as the average density of the humid mass conveyed through the system. It is important to note that for dimensions equal to those of known systems, the present system of extraction by the use of differential pressure established between the friction force between the surfaces of contact and the humid matter, provides for a retention time of the humid mass which is at least three times superior to that of the systems of the prior art resulting in a substantial increase of the utility of the present invention.

Figure 4A:
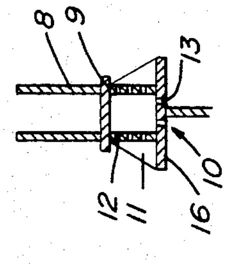
FIG. 4A is a cross-section view along cross-section lines B—B of FIG. 4.
Figure 4:
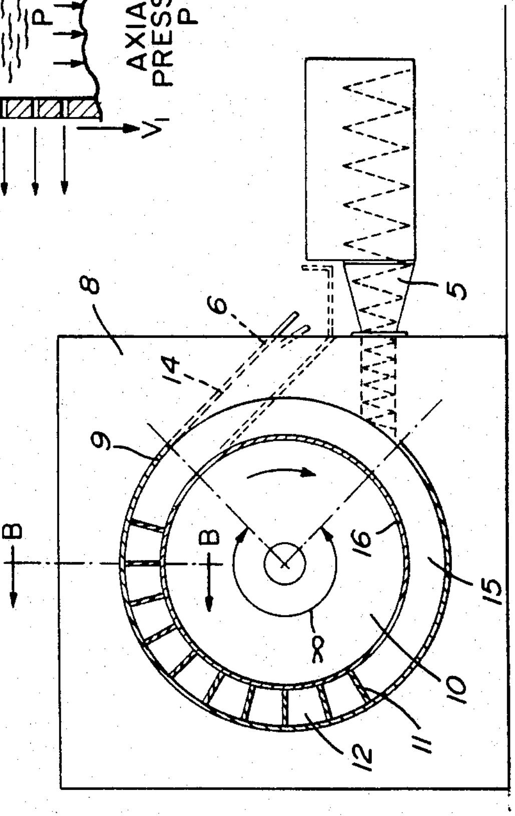
FIG. 4 is a schematic illustration of another example of the system of the present invention for continuously extracting a liquid contained in a humid mass and wherein one of the elements forming the conduit is constituted by a motorized wheel and the other element is maintained stationary whereby to define between elements a circularly disposed conduit through which the humid mass is conveyed.

FIG. 4 illustrates another example of the continuous liquid extraction system of the present invention from a humid mass and it constitutes a variant of the system of FIG. 3. The system of FIG. 4 does not occupy as much space as that of FIG. 3 due to the fact that the conduit 15 is disposed on a section of a circular arc instead of extending linearly but both systems have many common characteristics. In the case of FIG. 4 the passive or external side wall is also maintained fixed and it is also constituted of a single member of which the interior surface is smooth to decrease the friction force in the content area with the humid mass. The side wall 9 is maintained fixed by a rigid frame 8 which completely surrounds the system. Another common characteristic of this system resides in the fact that the cross-section of the channel or conduit 15 is also constant and rectangular.

In this particular example the driven (active) side wall 1 of the system of FIG. 3 is replaced by a wheel 10 which is also motor-driven and which is maintained at a substantially constant speed and it also acts in the same manner as the system of FIG. 3. This motorized wheel 10 is provided with an active side wall constituted by a peripheral flat wall 16 on which is secured lateral perforated side walls 12 maintained in position by reinforcing ribs 11 (see FIG. 4A). The peripheral wall 16 is also provided with perforations 13 through which liquid can flow. In this particular example the amount of liquid in the humid mass is controlled by the control plate 6 which is hinged to the outlet collector channel 14 disposed at the outlet of the convection conduit. At the inlet of the convection conduit the supply of the humid mass is effected by any one of many conventional feed devices 5 wherein the output thereof can be controlled as a function of various parameters of the system, as previously discussed with reference to FIG. 3, and taking into consideration the desired retention time of the humid mass in the interior of the conduit 15.

It is pointed out that the friction force on the active side wall of the wheel remains much higher than the friction force on the internal surface of the outer panel 9 as the friction surface on the peripheral walls 16 and 12 is superior to that on the outer side wall 9. The coefficients of friction can be increased on the active side wall and decreased on the side wall 9 by appropriate means such as forming slots on the said active side wall or coating the internal surface of the wall 9 with a smooth material offering very little resistance, such as Teflon (registered trademark). As previously mentioned, the difference between the two friction forces contributes to the progressive increase of the pressure along the conduit to attain a maximum pressure at the collector conduit 14. Thus, all along the travel, the liquid contained in the humid mass is drawn out by pressure towards the periphery of the wheel and through the perforations provided in the wall 16 of the wheel, the perforated side walls or panels 12 and the outer panel 9, such that the liquid in the humid mass is continuously diminished from the entrance I to the outlet O of the system. As previously described, the pressures become more and more elevated towards the outlet of the conduit and the liquid in the mass continuously decreases.

The angle $\alpha$ shown in FIG. 4 is selected as being the proper angle determining the effective length or working section of the conduit 12 and variation of this angle will of course affect the maximum pressure that one can obtain at the outlet O of the system. The larger this angle, the higher the pressure at the outlet.

It is evident that the system above described possesses many advantages and particularities not found in prior art systems. Thus, the examples of the preferred embodiment described and illustrated provide in one of its aspects a constant rectangular cross-section from its inlet to its outlet which permits the passage of large foreign matter which may be agglomerated with the humid mass. Further, for a conduit having the same length as that of the prior art, it is noted that with the present invention the quantity of humid mass which is stored in the conduit and the retention time of the mass in the conduit is superior to the prior art, and at least three to five times superior. In other words, for a given retention time, the length of the conduit or the working section of the conduit will be at least three to five times shorter than an extraction conduit utilized in prior art. Further, the control of the amount of liquid in the mass and of the maximum axial pressure exerted on the humid mass is achieved simply by increasing the resistance on the mass being convected at the outlet of the conduit and by simple mechanical means. In all examples of the preferred embodiment of the present invention herein described the number of parts utilized in this system is substantially diminished as compared to the prior art which translates in a substantial reduction in weight of the apparatus forming this system. Also, the cost of construction of the system and the cost of operation and maintenance is substantially reduced. In the case if the system as described and shown in FIG. 4, the internal pressure increases gradually from the inlet to the outlet by moving the humid mass by means of a friction wheel and this being independent of the feed means. The mass properties, the liquid contents as well as the quality of the humidity at the outlet always remains constant. It is also pointed out that the extraction of liquid through the perforations is facilitated due to the fact that it is effected transversely to the direction of movement of the humid mass in the conduit, thus permitting the construction of systems having relatively important load and production capacities.

It is within the ambit of the present invention to cover any obvious modifications of the examples of the preferred embodiment described herein provided such modifications fall within the scope of the appended claims. For example, the pressure extraction system of the present invention envisages untilizing a conduit having cross-sections which are variable for either linear or arcuately disposed conduits. Furthermore, the active side wall may be U or V shape cross-section or other suitable cross-section. It is also conceived that two or more of these systems can be used in parallel or in tandem to provide an economical operation or to provide a second stage or liquid exraction. It is also foreseen that the active and passive side walls may be constructed of tissues having suitable qualities to convect the liquid.

We claim:

1. A system for extracting liquid from a humid mass, said system comprising a conduit having an inlet end for admitting a humid mass therein as a continuous stream, said conduit having perforations in at least a working section of said conduit, means to gradually and progressively create an axial pressure at the interior of said humid mass, said conduit having a movable side wall section having a surface area greater than the surface area of the remaining side wall section, means to impart continuous movement to said movable side wall so that said movable side wall is displaced axially along at least said working section of said conduit for displacing a humid mass axially along at least said working section of the conduit, said movable side wall section creating a dynamic friction force between the inner surface of the conduit and the humid mass to define a pressure zone which is inferior to said axial pressure whereby to establish a differential pressure through said mass to cause liquid therein to flow out of said mass transversely to the direction of travel of said mass and out of said conduit through said perforated section, said conduit having an outlet end through which there is discharged a continuous output of said humid mass containing only a small percentage of liquid therein.

2. The system of claim 1 wherein the said conduit has a rectangular cross-section and is formed by a passive side wall and an active side wall, said active side wall being said movable side wall section and constituting a means to create said axial pressure.

3. A system as claimed in claim 2 wherein the said active and passive side walls comprise a plurality of rectangular panel sections and wherein the active wall is displaced by the said means for displacing at least one of said side walls.

4. A system as claimed in claim 1 wherein the said conduit as of rectangular cross-section and formed by an active side wall and a passive side wall, said active side wall being formed by a plurality of panel sections, each panel section having a transverse panel and two lateral panels at the ends thereof extending on a common side of said transverse panel, said means to impart continuous movement being a mechanical displacing means for displacing said active side wall which constitutes said movable side wall section.

5. A system as claimed in claim 2 wherein there is further provided displacing means to displace the passive side wall along said working section at a speed at most equal to that of the displacement speed of the active side wall.

6. A system as claimed in claim 2 wherein said passive side wall is a stationary side wall.

7. A system as claimed in claim 5 wherein said passive side wall is displaced at a speed lower than the speed of said active side wall and has a coefficient of friction which is lower than that of said active side wall.

8. A system as claimed in claim 1, 5, or 6, wherein the said conduit has a straight section of variable cross-section.

9. A system as claimed in claim 1, 5 or 6, wherein there is further provided a collector channel secured to said outlet end of said conduit, and control means connected to said collector channel to control said continuous output of said humid mass which contains only a small percentage of liquid, the said control means also constituting a means to create the said axial pressure.

10. A system as claimed in claim 1, 5 or 6, wherein there is further provided a feed mechanism to feed said humid mass to said inlet end, said feed mechanism also constituting a means to create the said axial pressure.

11. A system as claimed in claim 1, 5, or 6, wherein said conduit is linear.

12. A system as claimed in claim 1, 2, or 6, wherein said conduit is disposed on a circular axis.

13. A method of continuously extracting liquid from a humid mass by pressurization of said mass, said method comprising the steps of:

(a) feeding said humid mass to an inlet end of a conduit as a continuous stream, said conduit having perforations in at least a working section thereof;

(b) creating an axial pressure at the interior of said humid mass;

(c) continuously moving a movable side wall section of said conduit axially along at least said working section, said movable side wall section having a surface area greater than the surface area of the remaining side wall section of said conduit whereby to continuously displace said mass axially along at least said working section and to generate between the movable side wall section and said humid mass a dynamic friction force thereby creating a pressure which is inferior to said axial pressure whereby to create between the side wall section and the humid mass a low pressure zone which causes said liquid in said liquid mass to be displaced transversely to the direction of travel of said humid mass and to flow out of said conduit through said perforations; and (d) continuously discharging said mass which contains only a small percentage of liquid at an outlet end of said conduit.

14. A method as claimed in claim 13 wherein said differential pressure increases gradually from said inlet end to said outlet end of said conduit thereby gradually reducing the percentage of liquid in said liquid mass.

15. A method as claimed in claim 14 wherein the said conduit has an active side wall and a passive side wall, the said active side wall being said movable side wall section whereby to create a friction force between said mass and the interior surface of said side walls and to cause the flow of liquid from said mass and out of said conduit through said perforated active side wall, said displacement of said active side wall also constituting said step of creating said axial pressure.

16. A method as claimed in claim 15 wherein said passive side wall is maintained stationary and in which there is also provided perforations for the flow of said liquid therethrough.

17. A method as claimed in claim 15 wherein said passive said wall is also displaceable but at a speed inferior to the speed of the active side wall whereby to create a friction force between the active side wall and the humid mass which is greater than the friction force which exists between the passive side wall and the humid mass.

18. A method as claimed in claim 13 wherein said conduit is disposed in a straight line.

19. A method as claimed in claim 13 wherein said conduit extends on a working section of a circular axis.

20. A method as claimed in claim 19 wherein said active side wall is displaced on a circular axis by rotational drive means, said active side wall being defined by a flat peripheral surface of a wheel on which is secured lateral side walls extending from a common side of said flat surface, said flat surface of said wheel and said lateral side walls being perforated.

21. A method as claimed in claim 15, 17 and 20, wherein the output discharge of said humid mass compressed in said conduit to extract liquid therefrom is controlled by a control means secured to a collector channel which is secured to the outlet of said conduit where said compressed humid mass is collected said control means. constituting said step of creating said axial pressure.

22. A method as claimed in claim 15, 17, or 20, wherein said conduit is a straight conduit of uniform rectangular cross-section.

23. A method as claimed in claim 15, 17, or 20, wherein said conduit has a variable rectangular cross-section.

* * * * *